US011790782B2

United States Patent
Klawitter et al.

(10) Patent No.: US 11,790,782 B2
(45) Date of Patent: Oct. 17, 2023

(54) WARNING ABOUT A HAZARDOUS SITUATION IN ROAD TRAFFIC

(71) Applicant: Volkswagen Aktiengesellschaft, Wolfsburg (DE)

(72) Inventors: Matthias Klawitter, Braunschweig (DE); Onno Sundermann, Braunschweig (DE); Eduard Seib, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 102 days.

(21) Appl. No.: 17/610,491

(22) PCT Filed: Apr. 15, 2020

(86) PCT No.: PCT/EP2020/060592
§ 371 (c)(1),
(2) Date: Nov. 11, 2021

(87) PCT Pub. No.: WO2020/229077
PCT Pub. Date: Nov. 19, 2020

(65) Prior Publication Data
US 2022/0223044 A1 Jul. 14, 2022

(30) Foreign Application Priority Data
May 13, 2019 (DE) ...................... 10 2019 206 876.6

(51) Int. Cl.
*G08G 1/16* (2006.01)
*G08G 1/01* (2006.01)

(52) U.S. Cl.
CPC .......... *G08G 1/161* (2013.01); *G08G 1/0112* (2013.01); *G08G 1/166* (2013.01)

(58) Field of Classification Search
CPC ...... G08G 1/161; G08G 1/0112; G08G 1/166; G08G 1/0141; G08G 1/0133; G08G 1/162;
(Continued)

(56) References Cited

U.S. PATENT DOCUMENTS

| 6,615,137 | B2 * | 9/2003 | Lutter | G08G 1/162 |
| | | | | 340/436 |
| 6,792,351 | B2 * | 9/2004 | Lutter | G08G 1/164 |
| | | | | 701/515 |

(Continued)

FOREIGN PATENT DOCUMENTS

| CN | 104794936 A | 7/2015 | ............... G08G 1/16 |
| CN | 108297880 A | 7/2018 | ............ B60W 40/09 |

(Continued)

OTHER PUBLICATIONS

German Office Action, Application No. 102019206876.6, 8 pages, dated Apr. 2, 2020.

(Continued)

*Primary Examiner* — Sisay Yacob
(74) *Attorney, Agent, or Firm* — Slayden Grubert Beard PLLC

(57) ABSTRACT

To improve road safety, a method for warning about a hazardous situation in road traffic is specified, wherein the hazardous situation is identified by means of a vehicle guidance system and a warning system is to used to determine whether a road user is within an effective range in surroundings of a motor vehicle. Depending on the identified hazardous situation, the warning system is used to transmit a warning signal to the road user before an automatic reaction to the hazardous situation is initiated or prepared by means of the electronic vehicle guidance system.

14 Claims, 2 Drawing Sheets

(58) Field of Classification Search
CPC ... G08G 1/0145; G08G 1/0125; G08G 1/0965
See application file for complete search history.

(56) References Cited

U.S. PATENT DOCUMENTS

| | | | |
|---|---|---|---|
| 10,525,882 B2 | 1/2020 | Bernstein et al. | |
| 2002/0198660 A1* | 12/2002 | Lutter | G08G 1/0965 342/455 |
| 2004/0246114 A1 | 12/2004 | Hahn | 340/435 |
| 2013/0090806 A1 | 4/2013 | Hahne | 701/36 |
| 2014/0197939 A1 | 7/2014 | Stefan et al. | 340/435 |
| 2018/0194282 A1* | 7/2018 | Wolterman | G08G 1/096791 |
| 2019/0052842 A1 | 2/2019 | Du et al. | |
| 2020/0175873 A1* | 6/2020 | Xu | G08G 1/005 |
| 2020/0242922 A1* | 7/2020 | Dulberg | G08G 1/012 |
| 2020/0372800 A1* | 11/2020 | Klawitter | G08G 1/166 |

FOREIGN PATENT DOCUMENTS

| | | | | |
|---|---|---|---|---|
| DE | 102012001312 A1 | 8/2012 | | B60W 10/18 |
| DE | 102012215952 A1 | 3/2014 | | B60W 30/08 |
| DE | 102013016434 A1 | 4/2015 | | B60W 30/08 |
| DE | 102017008471 A1 | 6/2018 | | B60Q 9/00 |
| DE | 102017008679 A1 | 6/2018 | | B60W 30/08 |
| DE | 102019206876 B3 | 10/2020 | | B60Q 9/00 |
| EP | 2319732 A2 | 5/2011 | | B60Q 1/48 |
| WO | 03/001474 A2 | 1/2003 | | B60R 16/02 |
| WO | 2020/229077 A1 | 11/2020 | | B60W 30/09 |

OTHER PUBLICATIONS

International Search Report and Written Opinion, Application No. PCT/EP2020/060592, 8 pages, dated Jul. 10, 2020.

* cited by examiner

WARNING ABOUT A HAZARDOUS SITUATION IN ROAD TRAFFIC

CROSS-REFERENCE TO RELATED APPLICATIONS

This application claims priority to German Patent Application No. DE 10 2019 206 876.6, filed on May 13, 2019 with the German Patent and Trademark Office. The contents of the aforesaid Patent Application are incorporated herein for all purposes.

TECHNICAL FIELD

The present invention relates to a method for warning about a hazardous situation in road traffic, as well as a corresponding safety system, a motor vehicle, and a computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Driver assistance systems such as for example emergency braking assists of motor vehicles may initiate for example an evasive or braking maneuver partially or fully automatically in hazardous situations. Such evasive or braking maneuvers may also affect other road users since the other road users must for example also react to such an evasive or braking maneuver. In doing so, road users may be affected that are within the direct range of sight of the motor vehicle that initiates the evasive or braking maneuver, as well as road users that are outside of the direct range of sight.

SUMMARY

A need exists to provide improved warnings about a hazardous situation or a potentially hazardous situation in road traffic by means of which the safety of several affected road users may be increased.

The need is addressed by the subject matter of the independent claims. Embodiments of the invention are described in the dependent claims, the following description, and the drawings.

DESCRIPTION

Figure 1:
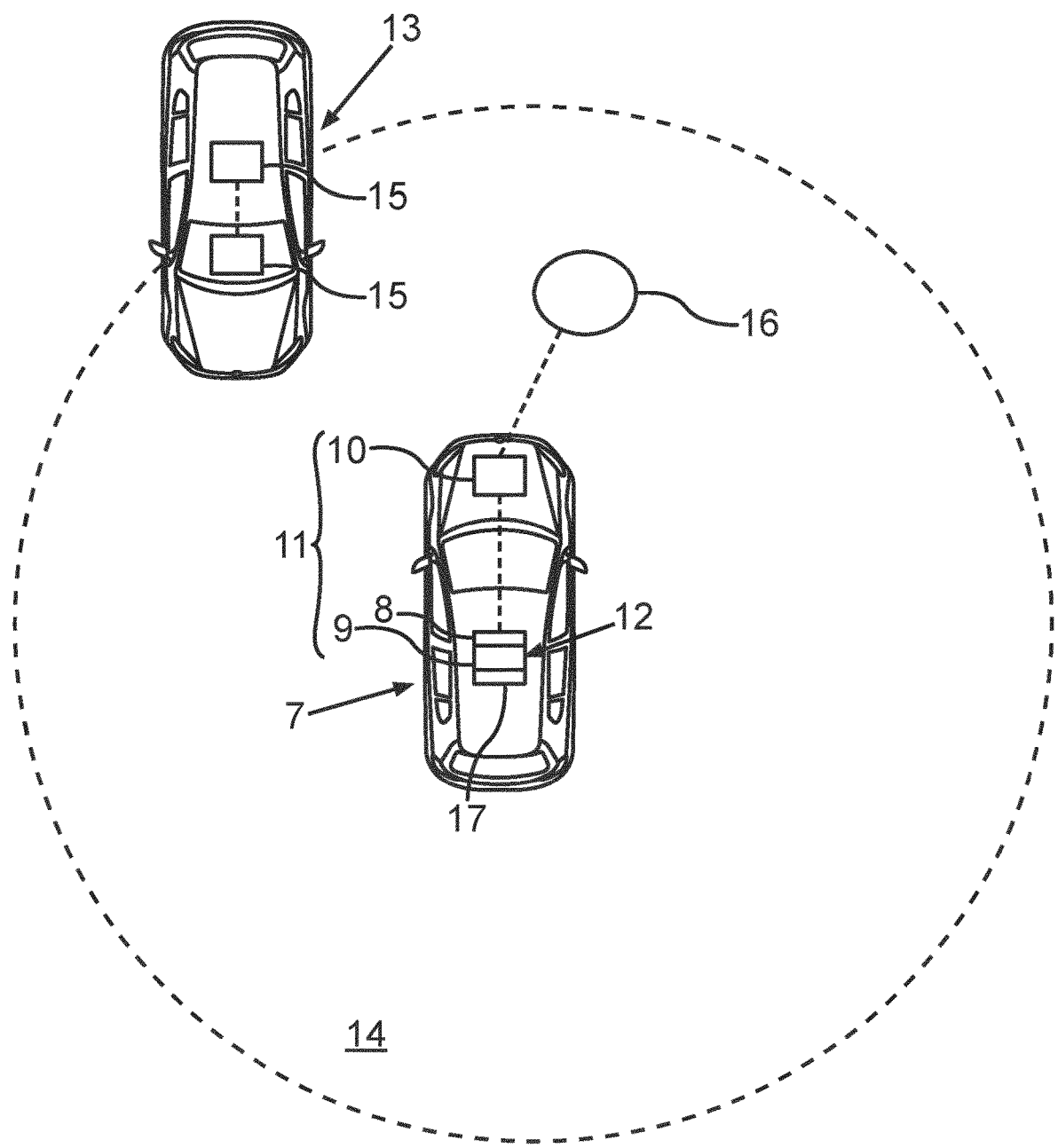
FIG. 1 shows an exemplary embodiment of a motor vehicle with an exemplary embodiment of a safety system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The teachings herein are based on the idea of identifying a hazardous situation by means of a motor vehicle and, depending thereupon, transmitting a warning signal to other road users, wherein with the warning by the warning signal, there is no wait until a reaction to the hazardous situation by the motor vehicle is actually initiated; instead, the warning signal is transmitted immediately after identifying the hazardous situation.

According to a first independent exemplary aspect, a method for warning about a hazardous situation or potentially hazardous situation in road traffic is provided, wherein the hazardous situation or potentially hazardous situation is identified by an electronic vehicle guidance system of a motor vehicle. By means of a warning system of the motor vehicle, it is determined whether a road user is located within an effective range in surroundings of the motor vehicle. If the road user is located within the effective range, a warning signal is transmitted to the road user by the warning system depending on the identified hazardous situation before an automatic reaction to the hazardous situation or potentially hazardous situation is initiated or prepared by the electronic vehicle guidance system.

A vehicle guidance system may in this case and in the following be understood to mean an electronic system that is configured to guide a motor vehicle in a fully automatic or fully autonomous manner, in particular without a driver having to intervene in a control procedure. In this case, the motor vehicle carries out steering, braking and/or acceleration maneuvers where required by itself and in a fully automatic manner. In particular, the electronic vehicle guidance system is used to implement a fully automatic or fully autonomous driving mode of the motor vehicle as per Level 5 of the SAEJ 3016 classification. An electronic vehicle guidance system may also be understood to mean an advanced driver assistance system (ADAS) which supports a driver during a partially automated or partially autonomous journey of a motor vehicle. In particular, the electronic vehicle guidance system is used to implement a partially automated or partially autonomous driving mode of the motor vehicle as per one of Levels 1 to 4 of the SAEJ 3016 classification.

The hazardous situation or potentially hazardous situation is in particular a hazardous situation or potentially hazardous situation for the motor vehicle, and/or for the road user, as long as the road user is located within the effective range. A hazardous situation corresponds for example to a situation that causes the electronic vehicle guidance system to initiate a reaction. A potential hazardous situation corresponds for example to a situation in which the electronic vehicle guidance system may initiate a reaction, but initiating a reaction to the potential hazardous situation may, however, be unnecessary. In the following, the term. "hazardous situation" also includes potential hazardous situations.

The electronic vehicle guidance system contains for example a sensor system and a computing unit coupled to the sensor system. The sensor system may generate one or more sensor signals depending on sensor measured values and transmit them to the computing unit for further processing or analysis. The measured sensor values may be measured values relating to the surroundings of the motor vehicle, and/or relating to one or more state variables of the motor vehicle. For example, the sensor system may include a distance sensor, an environmental sensor, a camera, an accelerometer, a rotation angle sensor, and/or the like.

That the electronic vehicle guidance system identifies the hazardous situation may for example be understood to mean that the computing unit determines, based on the sensor signal or the sensor signals, that a collision of the motor vehicle with an obstacle in the surroundings of the motor vehicle is immediately pending or may be pending, in particular with a certain probability.

The warning about the hazardous situation is in particular a warning of the road user and/or other road users within the effective range.

The road user may in particular be a person, for example a pedestrian, or a vehicle, for example a bicycle or a motor vehicle, that actively or passively participates in road traffic. Moreover, the road user may be a device for regulating road traffic such as a traffic light or a signal system. The road user is in particular not the motor vehicle.

To determine whether the road user is located within the effective range, a position of the road user may be provided to the warning system, for example by the road user itself, upon which the warning system may determine, based on the position, whether the road user is located within the effective range. The position of the road user may for example be a position relative to a reference coordinate system, for example the road or the roadway, or relative to the motor vehicle. The position of the road user may for example be determined by a position determining system of the road user, for example a global navigation satellite system.

Alternatively or in addition, the warning system of the motor vehicle itself may determine whether the road user is located within the effective range. To accomplish this, the warning system may for example receive position data for the position of the road user, in particular in the case of stationary road users such as for example a traffic light or signal system, from a database of the motor vehicle or an external database. Based on the position data, the warning system may determine whether the road user is located within the effective range.

Alternatively, the warning system may determine whether the road user is located within the effective range by a sensor system of the motor vehicle, for example a radar, a lidar, or a camera system.

In particular, the warning system may include a communication interface and an additional computing unit, or the computing unit of the electronic vehicle guidance system. The electronic vehicle guidance system and the warning system may both contain the computing unit, or the warning system may be part of the electronic vehicle guidance system, or vice versa.

The communication interface of the warning system is in particular a communication interface for vehicle-to-vehicle communication (car-to-car or vehicle-to-vehicle, C2C or V2V for short) or an interface for communication between a motor vehicle and other objects in the surroundings, i.e., in particular infrastructure objects in the surroundings (car-to-X or C2X for short).

The warning system may for example receive the position of the road user or the position data by means of the communication interface, and/or transmit the warning signal to the road user by means of the communication interface.

The effective range is in particular a range within the immediate surroundings of the motor vehicle, i.e., the motor vehicle itself is located within the effective range, in particular in the center of the effective range.

The effective range may for example be predetermined, for example by a fixed, predetermined distance from the motor vehicle. Alternatively, the effective range may be determined by the warning system. The effective range may for example also be termed the perimeter, wherein the perimeter does not necessarily have to have the shape of an exact geometric circle.

That the warning signal is transmitted to the road user before the automatic reaction is initiated or prepared, may for example be understood to mean that, in an event in which the automatic reaction to the hazardous situation is actually initiated or prepared by the electronic vehicle guidance system, the warning signal occurs between a point in time at which the hazardous situation is identified and the automatic reaction is initiated or prepared, in particular directly after the identification of the hazardous situation. Moreover, the warning signal may also be transmitted in such cases in which the hazardous situation is in fact identified, but an automatic reaction to the hazardous situation is however ultimately not initiated, for example when it turns out that such an automatic reaction is unnecessary. In such a case, the warning signal may also for example occur immediately after the identification of the hazardous situation that in this case is in particular a potential hazardous situation.

The initiation or preparation of the automatic reaction may be understood to mean that, when the electronic vehicle guidance system initiates or prepares the reaction, it is already certain that the automatic reaction will be carried out.

The automatic reaction includes in particular an automatic intervention into controlling the motor vehicle by the electronic vehicle guidance system, in particular in a braking system or a brake assembly, and/or a steering assembly or a steering system of the motor vehicle. The automatic reaction may for example include braking, in particular emergency braking or complete braking of the motor vehicle, and/or an evasive maneuver.

Electronic vehicle guidance systems, for example emergency braking assists, generally initiate automatic reactions, such as for example strong braking or evasive maneuvers, very late, more or less at the last moment. This may enhance the robustness of electronic vehicle guidance or driver assistance, and false initiations of automatic interventions or reactions may be avoided. The surrounding traffic, in particular the road user that is located within the effective range, may be endangered by such a sudden maneuver.

By a method of the teachings herein, the available time between identifying and actually initiating the automatic reaction is exploited to predictively output a warning to the road user. This allows the surrounding traffic to already be warned early on, in particular even in less acute or less critical situations in which the automatic reaction is not yet or perhaps not at all initiated.

This allows the road user to be warned, for example at a point in time at which an immediate reaction on its part is not yet required, so that a surprising moment, in particular the surprising coinciding of the warning with an actual, sudden change in the road situation is avoided. By the predictive warning, an in particular earlier warning may therefore occur before a potential hazardous situation so that the safety of the road traffic is increased.

Since road users may be warned within the entire effective range, direct visual contact between the road user and the motor vehicle, for example the brake light of the motor vehicle, is unnecessary. Accordingly, road users may also be warned that are more distant or are not located behind the motor vehicle such as road users that are driving on opposite lanes.

The benefits of the teachings herein are apparent for active road users such as for example additional motor vehicles or their drivers, bicyclists or pedestrians. The benefits also exist, however, when the road user is a passive road user, for example a traffic light or signal system. The traffic light or signal system may for its part trigger corresponding traffic light switching for example based on the warning signal, or display signals in order to indirectly warn the traffic within the effective range of the motor vehicle, or minimize an accident risk by corresponding traffic regulation.

In some embodiments, the effective range of the warning system is determined depending on a speed of the motor vehicle.

For example, the effective range may be all the greater the greater the speed of the motor vehicle. In particular, the effective range may have a radius, wherein the radius is all the greater the greater the speed of the motor vehicle.

This may further increase safety, since in the event of high speeds by the motor vehicle, road users within a larger range around the motor vehicle may be affected by the hazardous situation.

In some embodiments, the warning signal is transmitted by the warning system to the road user depending on a speed of the road user.

For example, the road user may transmit the speed of the road user and/or the position of the road user to the motor vehicle, in particular by means of C2C or C2X communication. The warning system may for example then not warn the road user by transmitting the warning signal when the road user is further distant from the motor vehicle than a maximum distance, wherein the maximum distance depends on the speed of the road user. The slower the speed of the road user, the smaller for example the maximum distance. The maximum distance is in particular less than or equal to the radius of the effective range. This allows road users with a particularly high speed within the entire effective range to be warned, whereas slower road users are for example not warned when they are within an outer region of the effective range.

Other road users may in particular be warned regardless of their speed when they are located within the effective range. For example, traffic lights or signal systems may always receive the warning signal when they are located within the effective range.

Such embodiments in which the speed of the road user is taken into account may allow the road user to only receive the warning signal when it is recommendable for him, so that he is not unnecessarily fed information that he may not be able to process.

In some embodiments, a type of road user is determined by the warning system, and the effective range is determined by the warning system depending on the type of road user.

A greater effective range may for example be determined for road users that do not move, such as, e.g., for traffic lights or signal systems, than for additional motor vehicles as road users.

A better adaptation of the warning to the particular road user is thereby achieved while simultaneously avoiding unnecessary information for the road user.

In some embodiments, the road user is an additional motor vehicle, and the warning system is received by a communication system of the additional motor vehicle. A user of the additional motor vehicle is presented with a warning notice by the communication system of the additional motor vehicle depending on the warning signal.

The warning notice may for example contain an acoustic, and/or an optical, and/or a haptic output signal.

The optical and/or the acoustic output signal may for example be presented as a display, or respectively sound or voice output on a man-machine interface, a navigation system, a head up display, an instrument cluster, an infotainment interface, or the like of the additional motor vehicle.

The user of the additional motor vehicle may thereby be notified of the potential hazardous situation and, if applicable, independently initiate a required reaction.

In another independent, exemplary aspect, a safety system to warn of a hazardous situation in road traffic is presented, wherein the safety system has a warning system of a motor vehicle. The warning system has an interface for receiving a hazard signal from an electronic vehicle guidance system of the motor vehicle. The warning system is configured to determine whether a road user is located within an effective range in surroundings of the motor vehicle. The warning system is furthermore configured to transmit a warning signal to the road user depending on the hazard signal before an automatic reaction to the hazardous situation is initiated or prepared by the electronic vehicle guidance system when the road user is located within the effective range.

The electronic vehicle guidance system is not necessarily part of the safety system but may be included by the safety system in various embodiments.

In particular, the electronic vehicle guidance system generates the hazard signal when the electronic vehicle guidance system has identified the hazardous situation, in particular based on the sensor signal.

In some embodiments of the safety system, the safety system includes the electronic vehicle guidance system, and the electronic vehicle guidance system is configured to identify the hazardous situation, in particular based on the sensor signal, and to generate the hazardous signal based on the identification of the hazardous situation.

In some embodiments, the additional road user is an additional motor vehicle, and the safety system contains a communication system of the additional motor vehicle. The communication system of the additional motor vehicle is configured to receive the warning signal, and to send a warning notice to a user of the additional motor vehicle depending on the warning signal.

Other embodiments of the safety system are directly apparent from the various embodiments and developments of the method, and vice versa. In particular, the safety system may be configured or programmed to execute a method according to the teachings herein. For example, the safety system executes a method according to the first exemplary aspect.

According to another independent, exemplary aspect, a motor vehicle containing a safety system according to the teachings herein is presented.

In some embodiments of the motor vehicle, the safety system contains a warning system of the motor vehicle. The warning system has an interface for receiving a hazard signal from an electronic vehicle guidance system of the motor vehicle. The warning system is configured to determine whether a road user is located within an effective range in surroundings of the motor vehicle and, depending on the hazard signal, to transmit a warning signal to the road user before an automatic reaction to the hazardous situation is initiated or prepared by the electronic vehicle guidance system when the road user is located within the effective range.

Other embodiments of the motor vehicle according to the teachings herein are directly apparent from the various embodiments of the method of the teachings herein, and vice versa.

According to another independent, exemplary aspect, a computer program with commands is presented, wherein when the computer program is run by a safety system according to the teachings herein, in particular by a warning system of the safety system, in particular by a computing unit of the warning system, wherein the commands cause the safety system to execute a method of the teachings herein.

In another independent, exemplary aspect, a computer-readable storage medium is presented on which a computer program of the teachings herein is saved.

Also belonging to the invention are embodiments of the method that have features which have already been described in conjunction with the embodiments of the motor vehicle or safety system. For this reason, the corresponding embodiments of the method will not again be described.

The invention also includes combinations of the features of the described embodiments.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a motor vehicle 7 that includes an exemplary embodiment of a safety system 11.

The safety system 11 has for example an electronic vehicle guidance system 10 that for example contains a sensor system. The sensor system may for example identify an obstacle 16 within surroundings of the motor vehicle 7, and/or determine a distance between the motor vehicle 7 and the obstacle 16. Based on the distance or other measurands, the sensor system for example generates a sensor signal.

The safety system 11 has a warning system 12 that for example contains an interface 8 which is coupled to the electronic vehicle guidance system 10, in particular the sensor system, in order to receive the sensor signal.

The electronic vehicle guidance system 10 may for example determine, in particular depending on the sensor signal, whether a hazardous situation or a potential hazardous situation exists, for example a pending or potentially pending collision of the motor vehicle 7 with the obstacle 16. If this is the case, the sensor signal may for example be a hazard signal. Alternatively or in addition, a hazard signal may be generated by the electronic vehicle guidance system based on the sensor signal, and the hazard signal may be transmitted to the interface 8 alternatively or in addition to the sensor signal.

The warning system 12 moreover has a computing unit 9 that is connected to the interface 8. The computing unit 9 may for example determine whether a road user, for example an additional motor vehicle 13, is located within an effective range 14 in surroundings of the motor vehicle 7. Purely by way of precaution, it is noted that the depiction of the effective range 14 is not true to scale, in particular with respect to the motor vehicle 7 and the additional motor vehicle 13 in FIG. 1.

The warning system 12, for example the computing unit 9 or a communication interface 17 of the warning system 12, may for example transmit a warning signal to the additional motor vehicle 13 depending on the hazard signal when the additional motor vehicle 13 is within, or partially within, the effective range 14.

Figure 2:
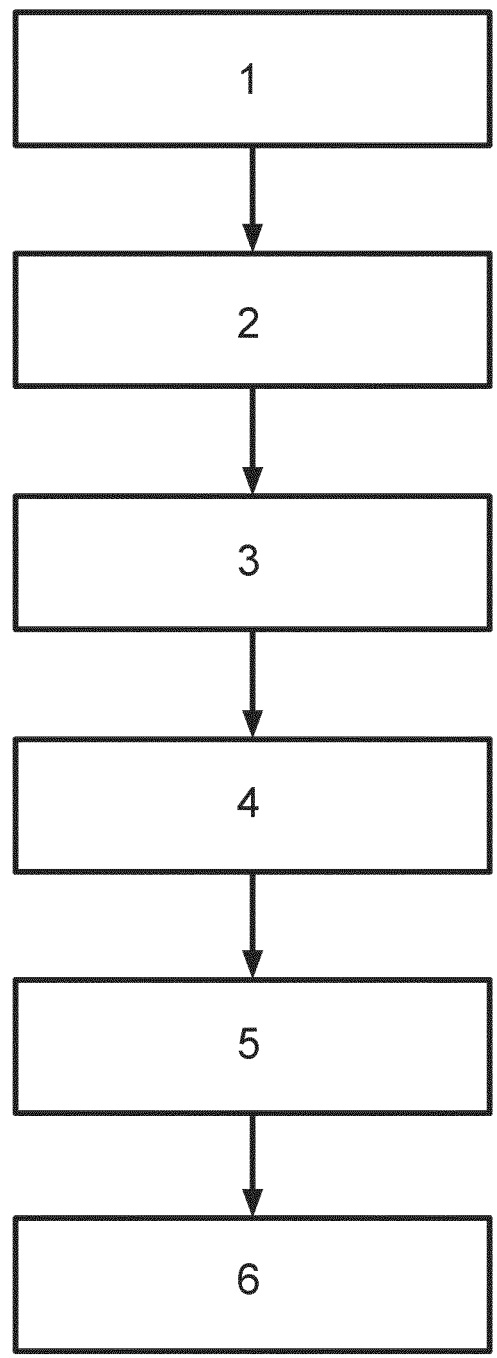
FIG. 2 shows a flowchart of an exemplary embodiment of a method.

The functionality of the safety system 11 will be described in greater detail below with reference to an exemplary embodiment of a method as schematically illustrated in FIG. 2.

In step 1 of the method, a hazardous situation is identified by the electronic vehicle guidance system 10. It may be determined by the electronic vehicle guidance system 10 that a collision between the motor vehicle 7 and the obstacle 16 may be pending.

In step 2 of the method, it is determined by the warning system 12 whether the additional motor vehicle 13 is located within the effective range 14. In this case, step 2 may occur before step 1 and/or at the same time as step 1.

If the hazardous situation is identified in step 1 and it is established in step 2 that the additional motor vehicle 13 is located within the effective region 14, a warning signal is transmitted for example in step 3 of the method by the warning system 12, in particular the communication interface 17, to the additional motor vehicle 13, in particular to a communication system 15 of the additional motor vehicle 13. The warning signal is transmitted before a reaction to the potential hazardous situation is initiated or prepared by the electronic vehicle guidance system 10. In particular, the warning signal is transmitted immediately after the identification of the hazardous situation.

In step 4 of the method, the warning signal is for example received by the communication system 15. In step 5 of the method, a user of the additional motor vehicle 13 may be presented with an acoustic, optical and/or haptic warning notice by the communication system 15 depending on the warning signal. To accomplish this, a corresponding output signal or corresponding warning message may for example be presented on an instrument cluster, a navigation system, an infotainment system or a head up display of the additional motor vehicle 13, in particular the communication system 15. Alternatively or in addition, there may be an acoustic warning of the user of the additional motor vehicle 13 through an audio system of the motor vehicle 13.

In step 6 of the method, the automatic reaction to the hazardous situation, for example a braking maneuver or an evasive maneuver, may for example be initiated by the electronic vehicle guidance system 10. Alternatively, it may be determined for example by the electronic vehicle guidance system 10 that an automatic reaction is in fact unnecessary and may therefore be omitted.

The fact is exploited that many driver assistance systems or electronic vehicle guidance systems are capable of identifying or recognizing hazardous situations or potential hazardous situations very early on, but however instigate automatic reactions relatively late for reasons of robustness or to avoid unnecessary actions. The timespan between identification and plausibilisation of the hazardous situation until automatic reactions are triggered is exploited in order to undertake a warning of road users within an effective range of the motor vehicle and thereby increase safety in road traffic.

The warning may for example be carried out by transmitting the warning signal to various or all participants in road traffic in an immediate traffic situation, i.e., in particular within the effective range, and therefore to all potentially endangered or affected road users. The effective range may be dependent on the distance, or respectively dependent on a GPS position of the road user from the motor vehicle. The effective range may for example have a radius on a scale of one hundred meters or several hundreds of meters. Moreover, the effective range may be scaled with the speed of the motor vehicle or with the speed of the road user.

LIST OF REFERENCE NUMERALS 1 to 6 Method steps
7 Motor vehicle
8 Interface
9 Computing unit
10 Electronic vehicle guidance system
11 Safety system
12 Warning system
13 Additional motor vehicle
14 Effective range
15 Communication system
16 Obstacle
17 Communication interface The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for warning about a hazardous situation in road traffic, comprising:
   identifying the hazardous situation by an electronic vehicle guidance system of a motor vehicle;
   determining an effective range of the motor vehicle depending on a speed of the motor vehicle;
   determining, using a warning system of the motor vehicle, whether a road user is located within the effective range; and
   if the road user is located within the effective range, transmitting a warning signal to the road user by the warning system depending on the identified hazardous situation before an automatic reaction to the hazardous situation is initiated or prepared by the electronic vehicle guidance system.

2. The method of claim 1, wherein the warning signal is transmitted by the warning system to the road user depending on a speed of the road user.

3. The method of claim 1, comprising:
   determining a type of road user by the warning system; and
   determining the effective range by the warning system depending on the type of road user.

4. The method of claim 1, wherein
   the road user is an additional motor vehicle;
   the warning signal is received by a communication system of the additional motor vehicle; and
   a user of the additional motor vehicle is presented with a warning notice by the communication system depending on the warning signal.

5. The method of claim 2, comprising:
   determining a type of road user by the warning system; and
   determining the effective range by the warning system depending on the type of road user.

6. The method of claim 2, wherein
   the road user is an additional motor vehicle;
   the warning signal is received by a communication system of the additional motor vehicle; and
   a user of the additional motor vehicle is presented with a warning notice by the communication system depending on the warning signal.

7. The method of claim 3, wherein
   the road user is an additional motor vehicle;
   the warning signal is received by a communication system of the additional motor vehicle; and
   a user of the additional motor vehicle is presented with a warning notice by the communication system depending on the warning signal.

8. A safety system for warning about a hazardous situation in road traffic having a warning system of a motor vehicle, wherein the warning system comprises an interface for receiving a hazard signal from an electronic vehicle guidance system of the motor vehicle; wherein
   the warning system is configured to:
   determine an effective range of the motor vehicle depending on a speed of the motor vehicle;
   determine whether a road user is located within the effective; and
   to transmit a warning signal to the road user depending on the hazard signal before an automatic reaction to the hazardous situation is initiated or prepared by the electronic vehicle guidance system when the road user is located within the effective range.

9. The safety system of claim 8, wherein
   the safety system comprises the electronic vehicle guidance system; and
   the electronic vehicle guidance system is configured to identify the hazardous situation and to generate the hazard signal based on the identification of the hazardous situation.

10. The safety system of claim 8, wherein the road user is an additional motor vehicle;
    the safety system comprises a communication system of the additional motor vehicle; and
    the communication system is configured to receive the warning signal and to send a warning notice to a user of the additional motor vehicle depending on the warning signal.

11. A motor vehicle with a safety system for warning about a hazardous situation in road traffic, wherein the safety system comprises an interface for receiving a hazard signal from an electronic vehicle guidance system of the motor vehicle; wherein the safety system is configured to:

determine an effective range of the motor vehicle depending on a speed of the motor vehicle;

determine whether a road user is located within the effective range; and to transmit a warning signal to the road user depending on the hazard signal before an automatic reaction to the hazardous situation is initiated or prepared by the electronic vehicle guidance system when the road user is located within the effective range.

12. A non-transitory storage medium having instructions that when executed by a safety system for a motor vehicle, cause the safety system to:

identify a hazardous situation;

determine an effective range of the motor vehicle depending on a speed of the motor vehicle;

determine, whether a road user is located within the effective range; and if the road user is located within the effective range, transmit warning signal to the road user depending on the identified hazardous situation before an automatic reaction to the hazardous situation is initiated or prepared by the electronic vehicle guidance system.

13. The safety system of claim 9, wherein the road user is an additional motor vehicle;

the safety system comprises a communication system of the additional motor vehicle; and the communication system is configured to receive the warning signal and to send a warning notice to a user of the additional motor vehicle depending on the warning signal.

14. The motor vehicle of claim 11, wherein the safety system comprises the electronic vehicle guidance system; and the electronic vehicle guidance system is configured to identify the hazardous situation and to generate the hazard signal based on the identification of the hazardous situation.

* * * * *